US006739678B2

United States Patent
Moebs et al.

(10) Patent No.: US 6,739,678 B2
(45) Date of Patent: May 25, 2004

(54) ISOLATED IDLER ASSEMBLY

(75) Inventors: Gregory B. Moebs, East Peoria, IL (US); Abram T. Valencic, Washington, IL (US); Thomas E. Oertley, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/201,379

(22) Filed: Jul. 23, 2002

(65) Prior Publication Data

US 2004/0017108 A1 Jan. 29, 2004

(51) Int. Cl.$^7$ .................. B60B 17/00; B62D 55/00; F16H 55/30; B60C 7/00
(52) U.S. Cl. .................. 305/136; 305/137; 305/199; 295/11
(58) Field of Search ................ 305/125, 120, 305/20, 124, 126, 129–130, 135–137, 194–195, 199, 139; 295/7, 11, 14

(56) References Cited

U.S. PATENT DOCUMENTS

| | | | | |
|---|---|---|---|---|
| 2,014,731 A | * | 9/1935 | Guernsey | 295/11 |
| 2,033,862 A | * | 3/1936 | Piron | 295/11 |
| 2,659,622 A | * | 11/1953 | Watter | 295/11 |
| 2,667,767 A | * | 2/1954 | Burrell | 464/91 |
| 3,147,048 A | * | 9/1964 | Johnson et al. | 384/584 |
| 3,797,895 A | * | 3/1974 | Tomizawa | 305/136 |
| 4,069,856 A | | 1/1978 | Sogge | |
| 4,111,064 A | | 9/1978 | Purcell | |
| 4,818,041 A | | 4/1989 | Oertley | |
| 5,183,306 A | * | 2/1993 | Emilsson | 295/11 |
| 5,702,141 A | * | 12/1997 | Broucke et al. | 295/7 |
| 6,012,784 A | * | 1/2000 | Oertley | 305/137 |
| 6,416,142 B1 | | 7/2002 | Oertley | |
| 6,540,630 B1 | * | 4/2003 | Oertley | 305/137 |
| 6,631,961 B1 | * | 10/2003 | Bedford et al. | 305/136 |

OTHER PUBLICATIONS

U.S. patent Appl. No. 09/688,531, filed Oct. 16, 2000, entitled "Reduced Sound Transmitting Sprocket for Track–Type Tractors", Thomas E. Oertley.
U.S. patent Appl. No. 09/940,004, entitled "Isolated Rim Idler", filed Aug. 27, 2001, Billy R. Bedford et al.

* cited by examiner

*Primary Examiner*—S. Joseph Morano
*Assistant Examiner*—Jason R. Bellinger
(74) *Attorney, Agent, or Firm*—Jeff A Greene

(57) ABSTRACT

An idler assembly includes a hub has a plurality of segments connected thereto. A groove is positioned in either an outer circumferential surface of the hub or the inner surface of the plurality of segments. The groove has first and second tapered sides that terminate at a bottom surface. An isolation member is mounted between the hub and at least one of the plurality of segments to provide sound suppression.

17 Claims, 4 Drawing Sheets

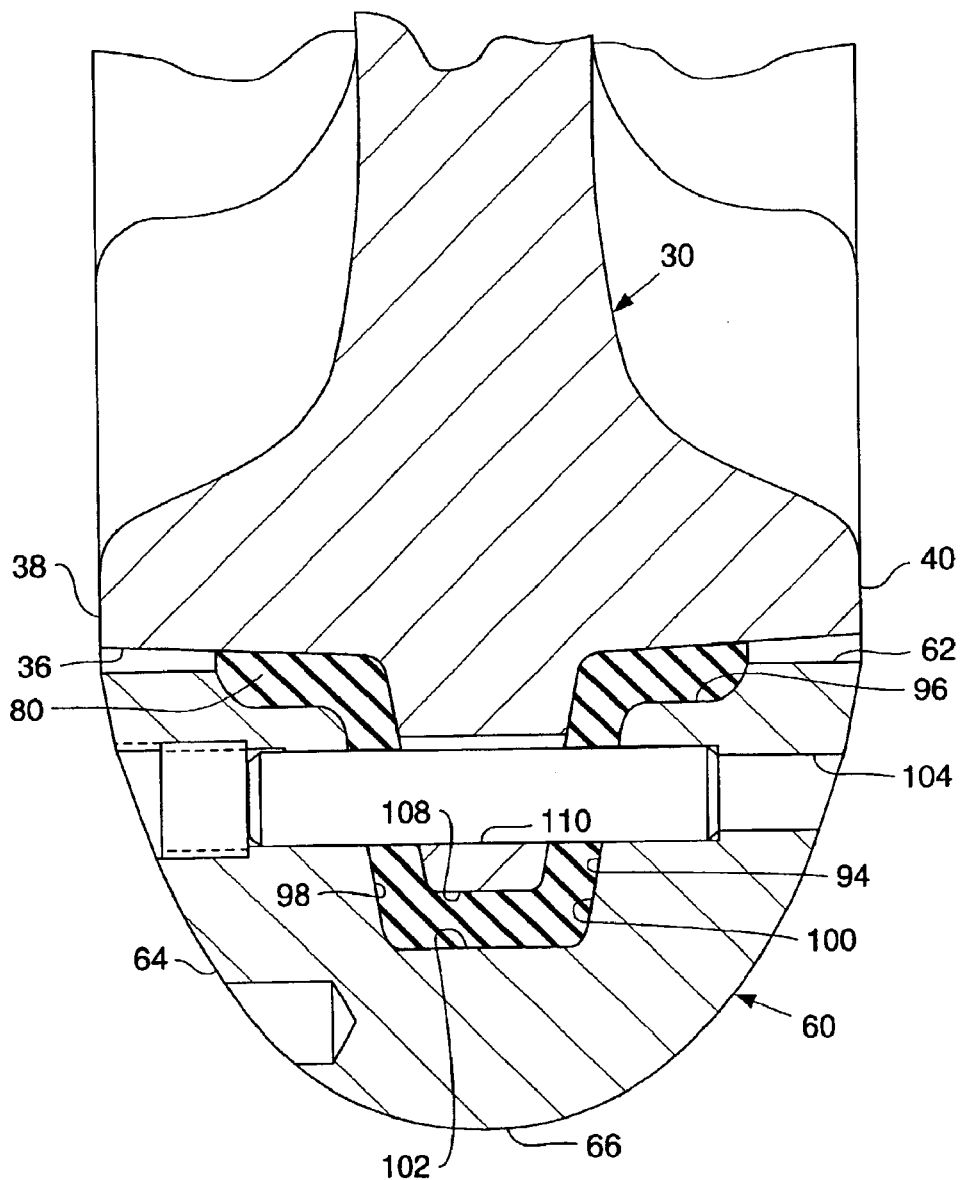

ISOLATED IDLER ASSEMBLY

TECHNICAL FIELD

The present invention relates to a track type work machine, and more particular to an idler assembly that provides sound suppression.

BACKGROUND

Operator comfort, as well as noise reduction regulations, requires reducing the sound decibel level emanating from a work machine. Perhaps one of the greatest sources of noise in earthmoving and construction work machines are the endless track chains as they revolve around and make contact with undercarriage components of the work machine. Idler wheels are used to guide and support portions of the track chains that are both manufactured using metal components, noise and vibration is generated between the track chains and the idler wheels during operation. This noise is then transmitted to, and typically amplified by, the hub of the idler wheel and the track chain.

One type of idler-wheel assembly used for isolating wear segments from an idler wheel hub is disclosed in U.S. Pat. No. 4,818,041 issued to Thomas Oertley on Apr. 4, 1989 and assigned to Caterpillar Inc. In this patent, resilient rings are place in two U-shaped cavities formed in the wheel assembly hub. The resilient rings are held in the cavities by hardened metal wear segments. The wear segments are clamped to the assembly by clamping plates secured to the hub by fasteners. However, this idler wheel assembly requires extensive casting and machining of the hub and the metal wear segments to form the shape of cavities and segments. In addition, the use of a clamping plate provides additional costs, as well as creates metal-to-metal contact between the clamping plate and the metal wear segments.

The present invention is directed to overcoming one or more of the problems as set forth above.

SUMMARY OF THE INVENTION

In one aspect of the present invention an idler assembly for a track type machine is provided. The idler assembly includes a hub having an outer circumferential surface. A plurality of segments each having an inner surface and an outer surface are connected to the hub. A groove is positioned in one of the outer circumferential surface of the hub or the inner surface of the plurality of segments. An isolation member is positioned in the groove between the hub and the plurality of segments.

BRIEF DESCRIPTION OF THE DRAWINGS

FIG. 4 illustrates a sectional view of another embodiment of an idler assembly according to the present invention.

DETAILED DESCRIPTION

Figure 1:
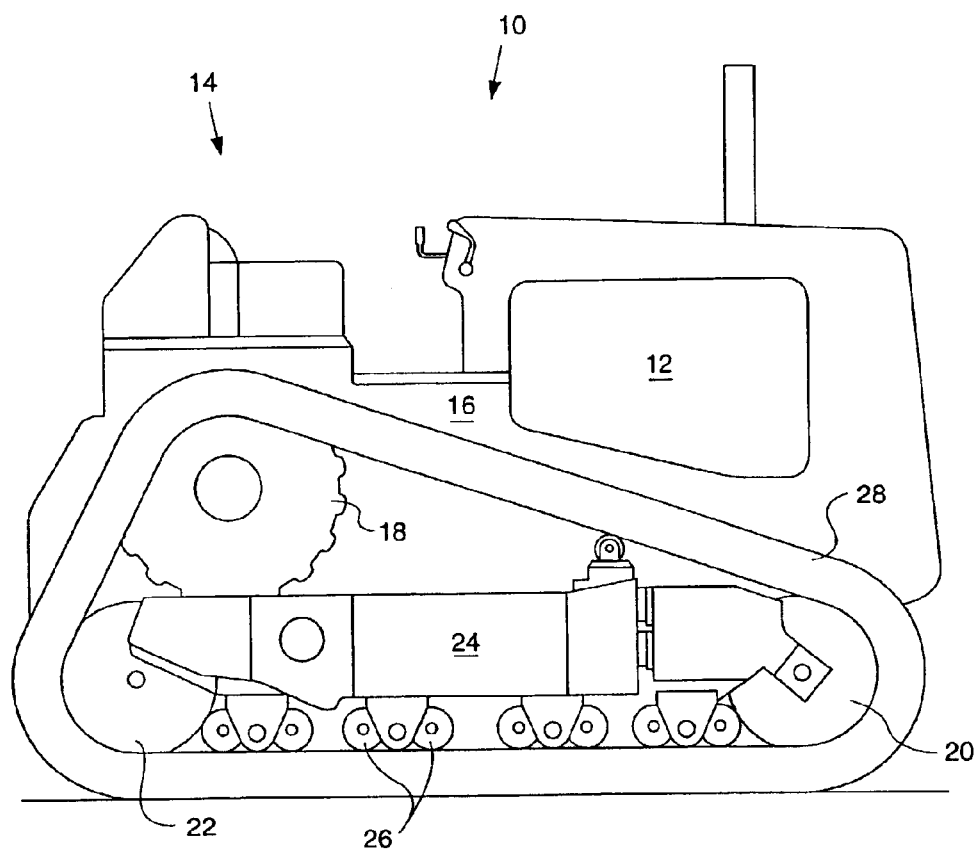
FIG. 1 illustrates a track type machine having an idler assembly embodying the present invention.

Referring to the drawings, specifically FIG. 1, a track type machine 10 is shown. The track type machine 10 includes an engine 12, an operator's station 14, a main frame 16, a drive sprocket 18, and front and rear idler assemblies 20,22. The main frame 16 supports a subframe 24, with the idler assemblies 20,22 being rotatably attached thereto, as well as a plurality of supporting guide rollers 26. An endless track 28 is entrained around the drive sprocket 18, the idler assemblies 20,22 and the supporting guide rollers 26. The idler assemblies 20,22 are substantially and functionally similar and, therefore, only the front idler assembly 20 will be described in detail.

Figure 2:
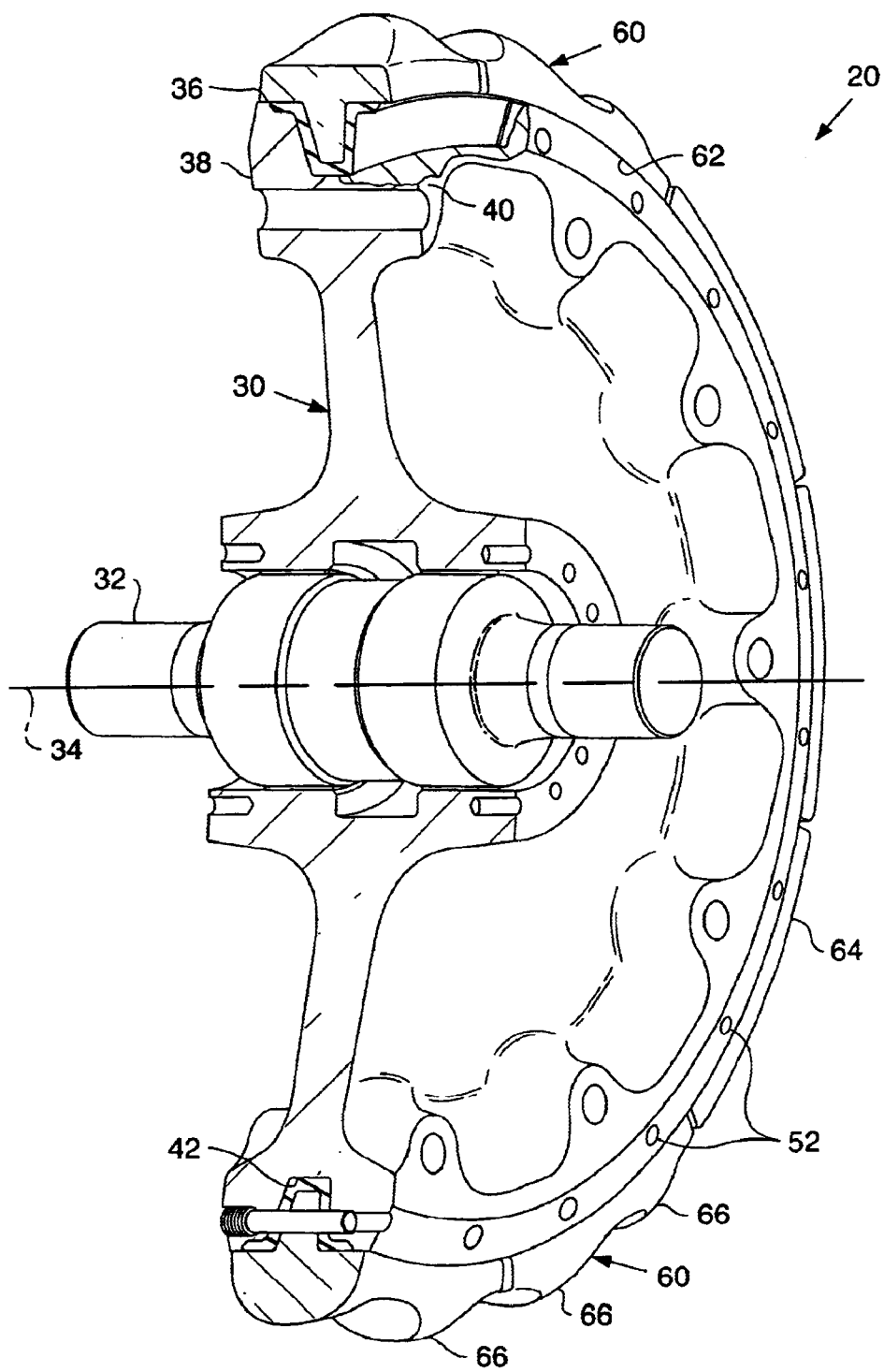
FIG. 2 is a partial sectional view of an idler assembly according to an embodiment of the present invention.
Figure 3:
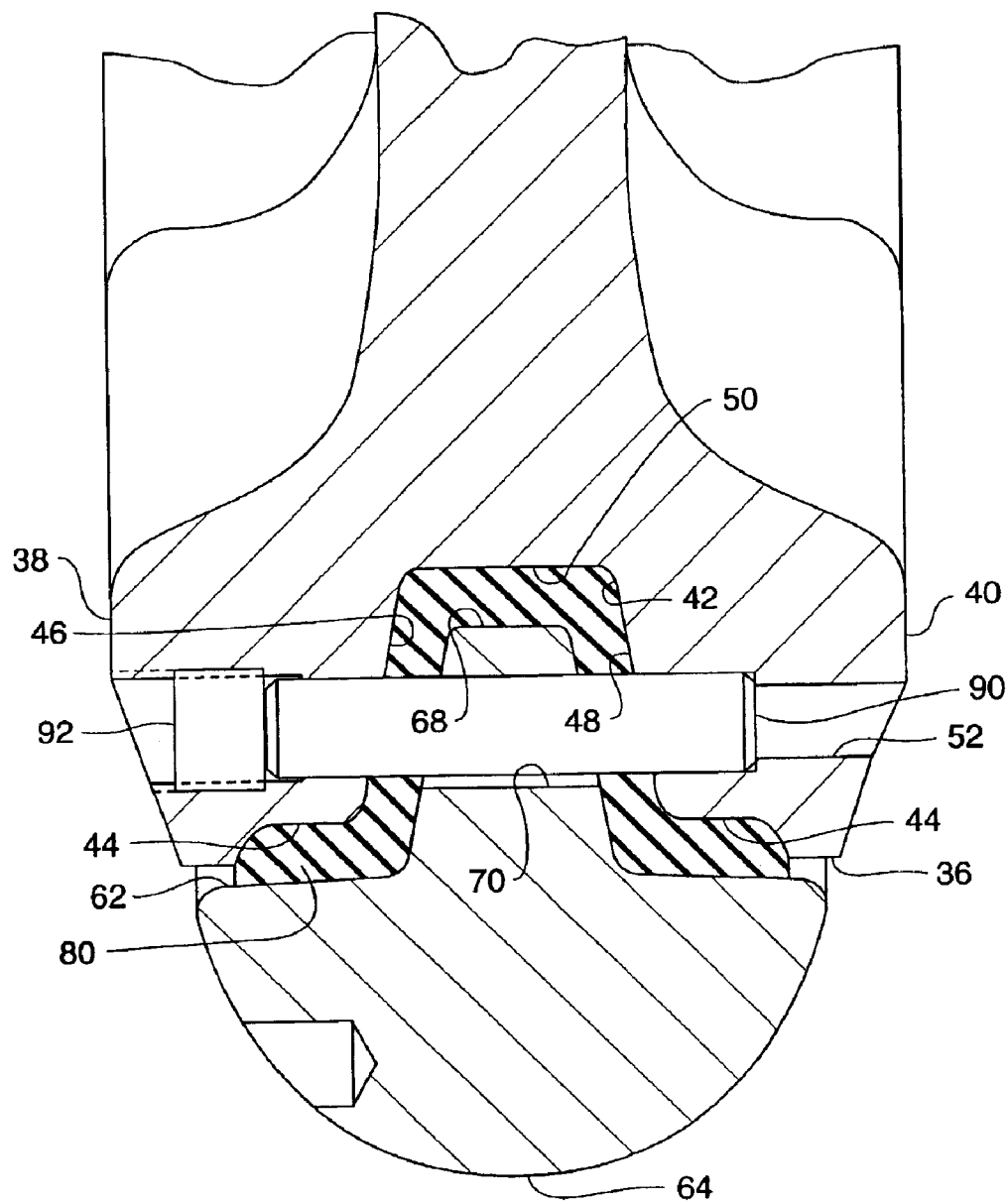
FIG. 3 illustrates a sectional view of the idler assembly according to the present invention.

With particular reference to FIGS. 2 and 3, the idler assembly 20 includes a hub 30 being rotatably supported by a shaft 32 defining a central axis 34. The hub 30 has an outer circumferential surface 36 and first and second sides 38,40. A groove 42 is centrally positioned in the outer circumferential surface 36. The groove 42 includes a stepped surface 44 being formed a predetermined depth inward from the outer circumferential surface 36. The groove 42 has first and second tapered surfaces 46,48 that extend inwardly from the stepped surface 44 and terminate at a bottom surface 50. The groove 42 therefore is shaped generally in the form of a "winged-V". It should be understood that numerous other configurations for the groove 42 may be applied and still retain the functional attributes as set forth herein. A plurality of apertures 52 are radially spaced a predetermined distance from the central axis 34 and extend from the first side 38 through to the second side 40.

As further shown in FIGS. 2 and 3, a plurality of idler segments 60 are attached to the outer circumferential surface 36 of the hub 30. Each idler segment 60 is arcuate in shape and has an inner surface 62 and an outer surface 64. Each idler segment 60 has at least one sprocket tooth 66 positioned on the outer surface 64 thereof, and is shown as having two sprocket teeth 66. Positioned on the inner surface 62 of each idler segment 60 and extending therefrom is a tongue portion 68 that rides in the groove 42. The tongue portion 68 may be of a similar shape as the first and second tapered surfaces 46,48 and the bottom surface 50 of the groove 42 so as to mate herewith. A hole 70 is positioned in the tongue portion 68 of the idler segment 60 that is alignable with the plurality of apertures 52.

An isolation member 80 is positioned in the groove 42 between the hub 30 and the tongue portion 68 of the idler segment 60. Isolation member 80 may be an elastomeric material such as rubber or metallic springs or any of a number of configurations that will provide the resilient isolation characteristics. The isolation members 80 are preloaded at assembly for load-carrying capacity purposes. The isolation member 80 may be a single circular band that is formed in the shape of and positioned in the "wing-V" groove 42 of the hub 30. As an alternative, the isolation member 80 may be individual segments that are equal in length and are placed in the groove 42 between each of the idler segments 60 and the hub 30, or individual segments that straddle two or more idler segments 60, or any other configuration and placement. The isolation member 80 may also be directly attached to the tongue portion 68 of each of the idler segments 60 or the groove 42 of the hub 30 by any conventional means such as, adhesively bonding or vulcanizing.

Pins 90, or other structures serving as a connector, are positioned within the plurality of apertures 52 of the hub 30 and respective holes 70 of each idler segment 60 to attach the idler segments 60 to the hub 30. The pins 90 may be held in place by a plug 92 as shown in FIG. 2 or by retaining rings, or other means known to those skilled in the art.

FIG. 4 illustrates another embodiment of an idler assembly 20 according to the present invention. Elements shown in FIG. 4 that are essentially similar to those shown in FIGS. 2 and 3, retain their same numerical identification.

As shown in FIG. 4, the segment 60 is arcuate in shape and has an inner surface 62 and an outer surface 64. Each idler segment 60 has at least a single sprocket tooth 66 positioned on the outer surface 64 thereof, and as shown in FIG. 2 has two sprocket teeth 66. Each idler segment 60 may have a plurality of the sprocket teeth 66 positioned on the outer surface 64. Centrally positioned on the inner surface 62 of each idler segment 60 and extending towards the outer surface 64 is a groove 94. The groove 94 includes a stepped surface 96 being formed a predetermined depth inward from the inner surface 62. The groove 94 has first and second tapered surfaces 98,100 that extend inwardly from the stepped surface 96 and terminate at a bottom surface 102. The groove 94 therefore is shaped generally in the form of a "winged-V". A hole 104 extends through the idler segment 60 and intersects the groove 94.

The hub 30 has an outer circumferential surface 36 and first and second sides 38,40. Positioned on the outer circumferential surface 36 and extending therefrom is a tongue portion 108 that is generally the same shape and mates with the first and second tapered surfaces 98,100 and the bottom surface 102 of the groove 94. A plurality of apertures 110 are equally radially spaced a predetermined distance from the central axis 34 and extend through the tongue portion 108.

An isolation member 80 is positioned in the groove 94 between the idler segments 60 and the tongue portion 108 of the hub 30. The isolation member 80 may be a single band that is formed in the shape and positioned over the tongue portion 108 of the hub 30. The isolation member 80 may be individual segments that are equal in length and are placed in the groove 94 between each of the idler segments 60 and the hub 30. Additionally, the isolation member 80 may be directly attached in the groove 94 of each of the idler segments 60 or the tongue portion 108 of the hub 30 by any conventional means such as, adhesively bonding or vulcanizing. Isolation member 80 may be an elastomeric material such as rubber or metallic springs or any of a number of configurations that will provide the resilient isolation characteristics as described herein. The isolation members 80 are pre-loaded at assembly for load-carrying capacity purposes.

INDUSTRIAL APPLICABILITY

In practice, the present invention provides a means of sound suppression by reducing the shock impact between the track link and idler assembly 20. This is done by isolating the idler segments 60 from the hub 30 of the idler 20. Since isolation is provided between at least one of the segments 60 and the hub 30 of the idler assembly 20 by an isolation member 80, neither the hub 30 of the idler assembly 20 nor the endless track 28 realizes the full impact. As such, sound is not transmitted to the hub 30. This is particularly important because sound is usually amplified by the hub 30.

In view of the foregoing, it is readily apparent that the structure of the present invention provides an idler assembly wherein the idler segments 20 are isolated from the hub 30 to provide sound suppression by changing the track link impact characteristics of the track idler assembly.

Other aspects, objects, and advantages of this invention can be obtained from a study of the drawings, the disclosure and the appended claims.

What is claimed is:

1. An idler assembly for a track type machine comprising:
   a hub having an outer circumferential surface;
   a plurality of segments having an inner surface and an outer surface, said plurality of segments being connected in an end to end manner and extend radially outward from said hub;
   a groove being positioned in a one of said outer circumferential surface of said hub and said inner surface of said plurality of segments, said groove having tapered sides that terminate at a bottom surface; and
   an isolation member positioned in said groove between the hub and said plurality of segments.

2. The idler assembly according to claim 1, wherein said groove includes a stepped surface being formed a predetermined depth inward from said one of said outer circumferential surface of said hub and said inner surface of said plurality of segments.

3. The idler assembly according to claim 1, including a tongue portion extending from the other one of said outer circumferential surface of said hub and said inner circumferential surface of said plurality of said segments.

4. The idler assembly according to claim 3 wherein said tongue portion is generally the same shape as the groove.

5. The idler assembly according to claim 1, wherein said groove includes a stepped surface having a predetermined depth and length positioned in connecting relationship to the tapered sides.

6. The idler assembly according to claim 5, wherein said isolation member farms an endless circular band positioned about a one of said groove and said tongue portion positioned on said outer circumferential surface of said hub.

7. The idler assembly according to claim 5, wherein said isolation member is individual segments being attached to a one of said tongue portion and said groove positioned on said inner surface of each said plurality of segments.

8. The idler assembly according to claim 7, wherein said isolation member contacts said stepped surface, said tapered sides and said bottom surface of said groove.

9. The idler assembly according to claim 1, wherein said plurality of segments each include at least one sprocket tooth positioned on the outer surface thereof.

10. The idler assembly according to claim 1, wherein said plurality of segments each include a pair of sprocket teeth positioned on the outer surface thereof.

11. The idler assembly according to claim 1, wherein said plurality of segments is connected to said hub by pins.

12. An idler segment for connecting to an outer circumferential surface of a hub, said hub includes a plurality of radially spaced apertures extending from a an inner surface;
   an outer surface being radially spaced from said inner surface; and
   a one of a groove and a tongue portion centrally positioned on said inner surface.

13. The idler segment according to claim 12, wherein said groove includes first and second tapered surfaces and terminates at a bottom surface.

14. The idler segment according to claim 13, wherein said groove includes a stepped surface being formed a predetermined depth inward from said inner surface.

15. The idler segment according to claim 12, including an isolation member being positioned between the outer circumferential surface of said hub and said one of a groove and a tongue portion.

16. The idler segment according to claim 15 wherein said isolation member is attached to said one of a groove and a tongue portion.

17. The idler segment according to claim 12, including a pin positioned through a one of the plurality of apertures of the hub and a hole positioned through said one of a groove and a tongue portion.

* * * * *